United States Patent
Takeshima et al.

[11] Patent Number: 5,535,044
[45] Date of Patent: Jul. 9, 1996

[54] OPTICAL FREQUENCY MIXING APPARATUS

[75] Inventors: Akira Takeshima; Musubu Koishi, both of Hamamatsu, Japan

[73] Assignee: Hamamatsu Photonics K.K., Hamamatsu, Japan

[21] Appl. No.: 480,787

[22] Filed: Jun. 7, 1995

[30] Foreign Application Priority Data

Jul. 6, 1994 [JP] Japan .................................. 6-154910

[51] Int. Cl.⁶ .............................. H04B 10/06; G01C 3/08
[52] U.S. Cl. ........................ 359/245; 359/191; 356/5.09; 356/5.15
[58] Field of Search ................................ 359/245, 191; 356/5.09, 5.15

[56] References Cited

U.S. PATENT DOCUMENTS

| | | | |
|---|---|---|---|
| 4,093,380 | 6/1978 | White | 356/5 |
| 4,156,135 | 5/1979 | Miller, Jr. et al. | 250/199 |
| 5,051,573 | 9/1991 | Mizushima et al. | |
| 5,111,333 | 5/1992 | Coles et al. | 359/333 |
| 5,352,885 | 10/1994 | Niki | 250/214 R |
| 5,396,361 | 3/1995 | Sasaki et al. | 359/189 |

FOREIGN PATENT DOCUMENTS

0559102A1  9/1993  European Pat. Off. .

OTHER PUBLICATIONS

Liu, Qing Z, and MacDonald, R. Ian, "Controlled Nonlinearity Monolithic Integrated Optoelectronic Mixing Receiver", IEEE Photonics Technology Letters, vol. 5, No. 12, pp. 1403–1406, Dec. 1993.
English language foreign Search Report dated Oct. 3, 1995.
Metal–Semiconductor–Metal Photodetector for High-Speed Optoelectronic Circuits, Japanese Journal of Applied Physics, vol. 19 (1980), Supplement 19-1, pp. 459–464.

*Primary Examiner*—Mark Hellner
*Attorney, Agent, or Firm*—Cushman Darby & Cushman

[57] ABSTRACT

An optical frequency mixing apparatus is provided. Mixing of a frequency of an incident light intensity and a frequency ($f_3$) of an AC signal generated by a signal generator, i.e., product calculation of the two signals is executed by a photoconductive photodetector of a photodetecting unit. This apparatus has a large allowance for unnecessary incident light such as background light and output characteristics having satisfactory linearity with respect to the incident light intensity, and can deeply set gain modulation. One of the frequency components of the sum and difference between the two signals, which is obtained as a result of product calculation, is selected and extracted using a frequency selector. As an incident optical signal, one optical signal whose light intensity has an AC component (frequency=$f_1$) may be used. Alternatively, two optical signals whose light intensities have different frequencies (frequencies=$f_1$ and $f_2$) may be incident on substantially the same photodetecting area of the photoconductive photodetector.

9 Claims, 11 Drawing Sheets

OPTICAL FREQUENCY MIXING APPARATUS

BACKGROUND OF THE INVENTION

1. Field of the Invention

The present invention relates to an optical frequency mixing apparatus for calculating a product value between a conversion signal of received intensity-modulated light and a predetermined frequency signal and outputting the product value.

2. Related Background Art

Light is often used for high-speed phenomenon measurement, high-precision measurement, and the like. This is because in principles, light is an electromagnetic wave having a very short wavelength, which can carry a large amount of information of target measurement phenomenon within a short time. In addition, progress in laser techniques, which allows light with good coherency and a high intensity to be obtained, also motives the widespread and actual use of light. On the other hand, most measurement apparatuses use an electrical method. Generally, electrical control can be most precisely and easily realized.

However, conventional electronic circuit parts are often so poor in response performance to directly convert information carried by light to be measured (i.e., waveform of the light) into an electrical signal. For this reason, it is necessary to convert the information carried by the light to be measured into a signal form which can be precisely controlled by an electronic circuit while preserving the information carried by the light to be measured.

In a typical signal conversion system, light to be measured and appropriate known reference light are caused to interfere with each other, and the light is converted into an electrical signal matching a frequency according to the difference between the two light wavelengths. The first example of this system is used by, e.g., a laser Doppler velocimeter, in which illumination light and light reflected by an object are caused to interfere with each other, and a beat frequency is measured. The second example of this system is a heterodyne interferometer. In these systems, two light waves having different frequencies are caused to be incident on the photoelectric conversion surface of a photodetector while keeping spatial coherency, and an electrical signal matching a frequency according to the difference between the wavelengths of the two light waves obtained from the photodetector is measured.

In recent years, the speed and precision of phenomena to-be-measured has become higher. Accordingly, as for a signal matching the frequency according to the difference between the wavelengths of the two light waves, measurement beyond the response characteristics of the electrical circuit at the subsequent stage is required. In some cases, light which is intensity-modulated within a known frequency range beyond the response characteristics of the electrical circuit at the subsequent stage is received. In this case, the characteristic frequency of the incident light must be further lowered.

Figure 1:
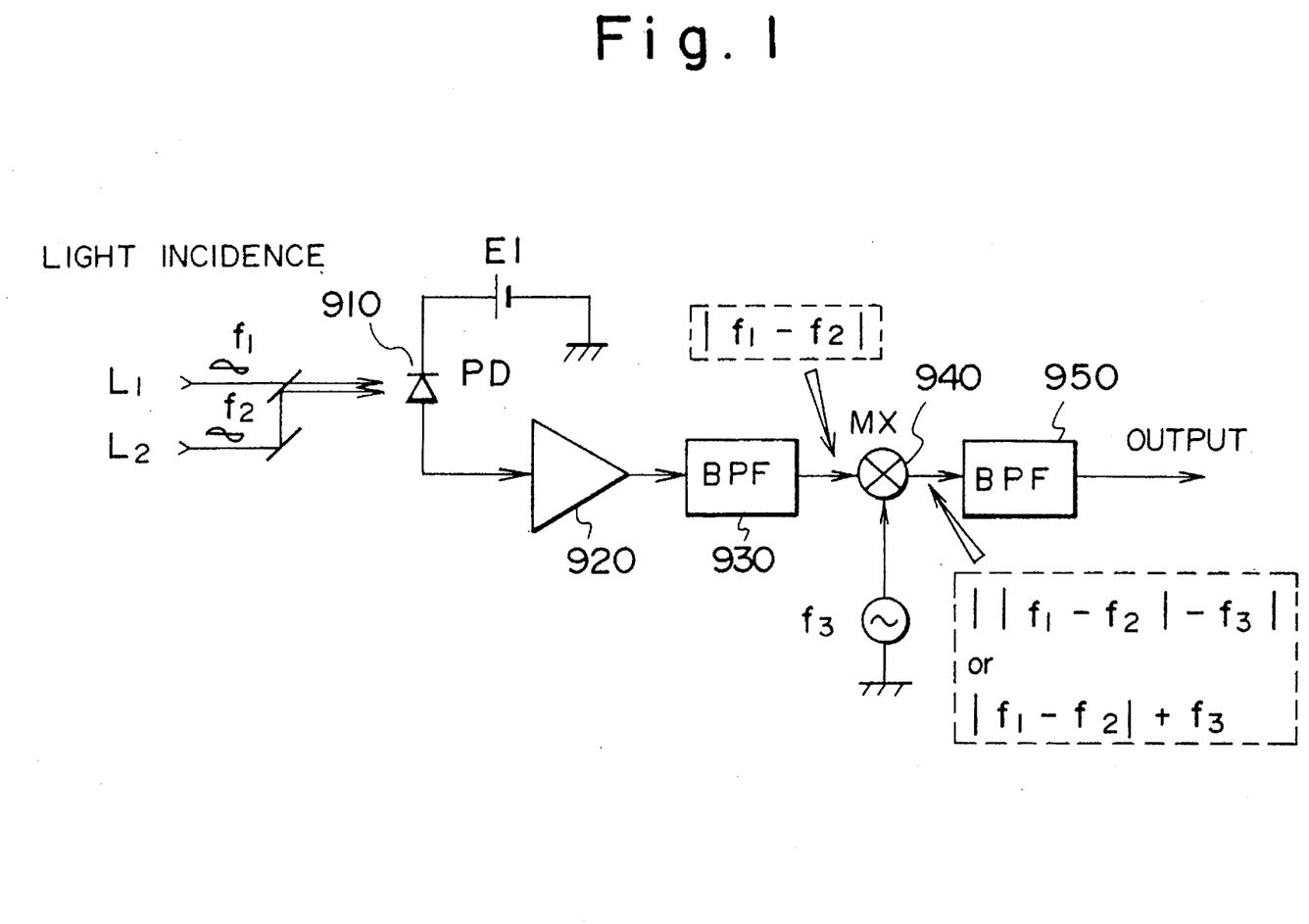
FIG. 1 is a block diagram showing the arrangement of the first prior art of an optical frequency mixing apparatus.

FIG. 1 is a block diagram showing the arrangement of a conventional typical frequency mixing apparatus for lowering a frequency. As shown in FIG. 1, in this apparatus, light waves including the components of two frequencies (f1 and f2) are received by a photodetector (PD) 910. An electrical signal generated in the photodetector 910 upon reception of the light is supplied to an amplifier 920 and amplified. Thereafter, only a signal component having a frequency of about |f1−f2| is selected by a bandpass filter 930. The electrical signal passing through the bandpass filter 930 is mixed with an electrical signal having a frequency f3 in a signal mixer 940 and converted into an electrical signal according to the product value of the two signals. The signal obtained upon conversion includes the components of two frequencies (||f1−f2|−f3| and |f1−f2|+f3). A bandpass filter 950 selects the component of the frequency (||f1−f2|−f3|) and outputs this frequency component.

Figure 2:
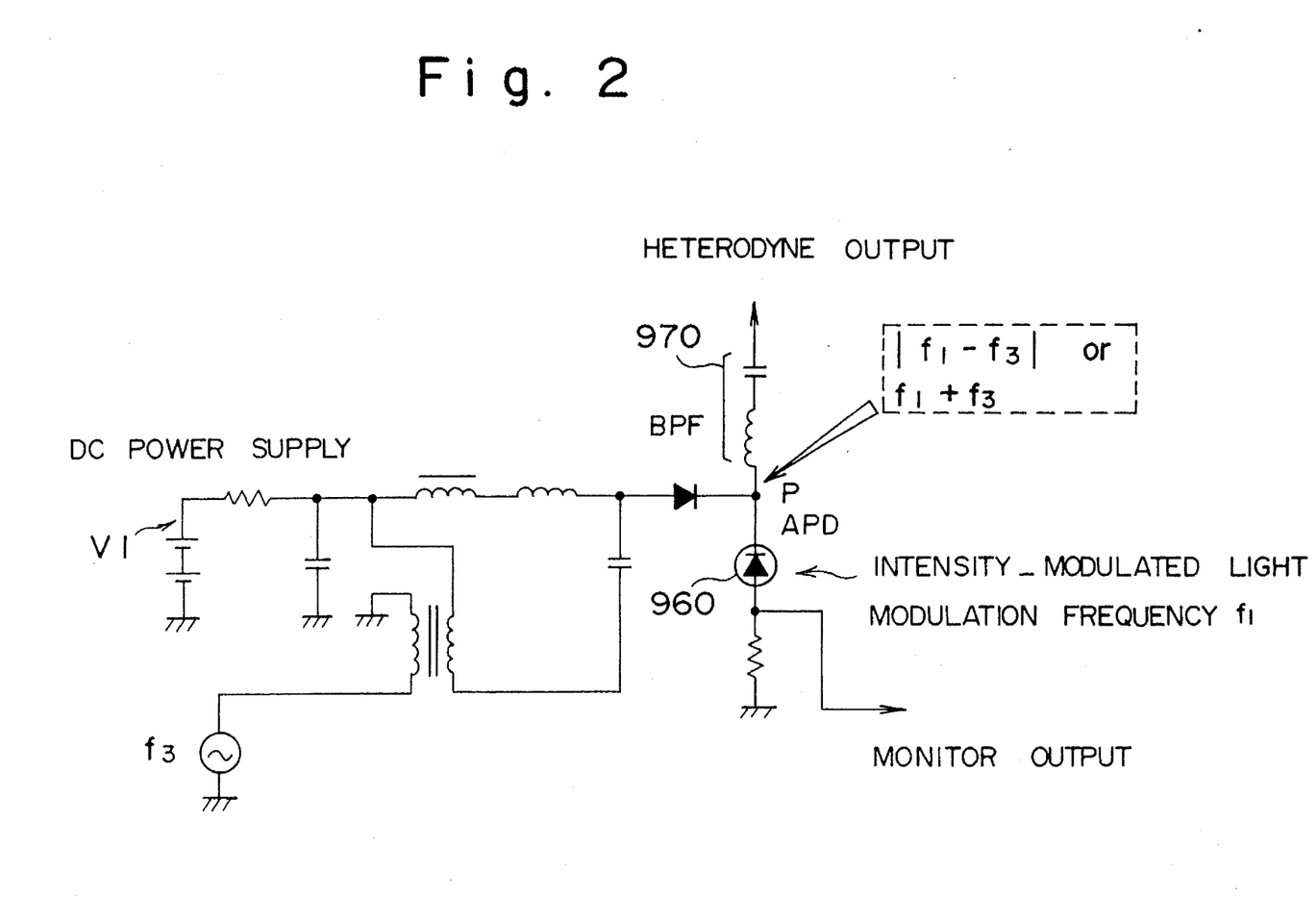
FIG. 2 is a block diagram showing the arrangement of the second prior art of an optical frequency mixing apparatus.

An apparatus is proposed in Japanese Patent Laid-Open No. 62-279732, in which intensity-modulated light is received by an avalanche photodiode (to be referred to as an APD hereinafter) which is biased by a signal superposed with an AC component, thereby simultaneously performing photoelectric conversion and frequency mixing. FIG. 2 is a block diagram of this apparatus. In this apparatus, intensity-modulated light modulated by the modulation frequency f1 is received by an APD 960 which is biased by a signal having the frequency f3, which is superposed with a DC signal. Upon reception of the light, a current is generated in the APD 960, and a voltage signal including the components of two frequencies (|f1−f3| and f1+f3) is generated at a position P. A bandpass filter 970 selects the component of the frequency (|f1−f3|) and outputs this frequency component.

The conventional optical frequency mixing apparatuses with the above arrangements have the following problems.

In the conventional optical frequency mixing apparatus shown in FIG. 1, when the amplitudes of the two light waves incident on the photodetector 910 vary, the electrical operating points of the photodetector 910, the amplifier 920, and the signal mixer 940 change to make the detecting operation unstable. Additionally, in an environment with large background light (DC light or light including intensity-modulated components unrelated to measurement), the performance cannot be sufficiently exhibited because of saturation of photodetecting elements used in the photodetector 910 or the mixing/modulation characteristics of the circuit elements of the apparatus. Furthermore, to perform heterodyne detection between light waves, the light waves are converted into electrical signals by the photodetector 910 and thereafter mixed with each other. Since this operation requires a high-speed amplifier at the first stage, the number of circuit constituent elements increases. In some cases, the detection precision of the difference frequency is limited due to noise, drift, or offset of the circuit elements.

Figure 3:
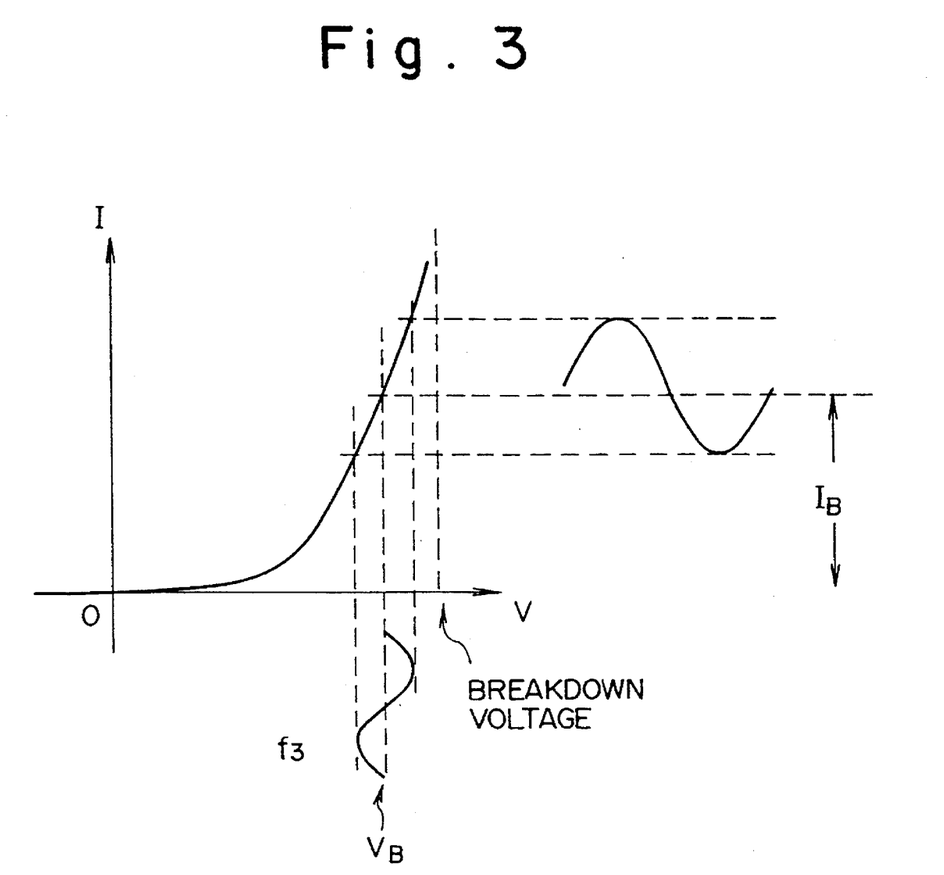
FIG. 3 is a graph for explaining the modulation characteristics of the second prior art.

In the conventional optical frequency mixing apparatus as shown in FIG. 2, the DC bias voltage of the APD 960 is superposed with a high-frequency voltage, thereby directly obtaining a heterodyne signal from the photodetector. In this apparatus, a desired heterodyne signal can be easily extracted at a high conversion efficiency without using any electrical mixer with a large loss. However, an APD generally has voltage-to-current characteristics represented as an exponential function, as shown in FIG. 3. Therefore, application of a high-frequency voltage having a large amplitude for deep modulation provides no advantage against distortion in the extracted heterodyne signal. In addition, to ensure an avalanche multiplication gain, a bias voltage is required to be applied to an almost pole of a breakdown voltage value. For this reason, a temperature compensation circuit for a bias voltage is essential to control a breakdown voltage having characteristics sensitive to a temperature. Furthermore, when a bias voltage value ($V_1$) is set at a high level to ensure a large multiplication gain of the APD and increase the photoelectric conversion gain, operating points vary due to DC background light or light including intensity-modulated components unrelated to measurement. Simultaneously, the APD itself tends to be saturated by an increase in average current ($I_0$).

SUMMARY OF THE INVENTION

It is an object of the present invention to provide an optical frequency mixing apparatus which has a large allowance for unnecessary incident light such as background light and output characteristics having satisfactory linearity with respect to the incident light intensity, and can deeply set gain modulation, thereby obtaining a high conversion efficiency.

According to the present invention, there is provided an optical frequency mixing apparatus comprising (a) a signal generator for generating an AC electrical signal having a first frequency, (b) a signal supply unit for receiving the AC electrical signal output from the signal generator, converting the AC electrical signal into a predetermined output form, and outputting an electrical signal, (c) a photoconductive photodetector, having an electrical signal application terminal for receiving the electrical signal output from the signal supply unit, for receiving light to be measured including a component of a second frequency, (d) a current-to-voltage conversion unit for converting a current signal flowing through the photoconductive photodetector into a voltage signal and outputting the voltage signal as a second voltage signal, and (e) a frequency selector for receiving the voltage signal output from the current-to-voltage conversion unit and selecting and passing one of a voltage signal having almost the same frequency as that of a sum between the first frequency and the second frequency and a voltage signal having almost the same frequency as that corresponding to an absolute value of a difference between the first frequency and the second frequency.

The predetermined output form may be ① a voltage signal (voltage modulation type) output in a low output impedance state or ② a current signal (current modulation type) output in a high output impedance state.

The apparatus can further comprise bias adjustment means for adjusting an operating point of the photoconductive photodetector.

As for the voltage modulation type, it is preferable that, ① in the photoconductive photodetector, an amount of a current flowing through the photoconductive photodetector be represented as an almost odd function of an applied voltage in a predetermined domain including an applied voltage value of 0 V when an intensity of the light to be measured is constant, and the applied voltage value is an independent variable, and at the same time, the amount of the current flowing through the photoconductive photodetector be represented as an almost linear function of an illumination signal intensity in a domain having a predetermined intensity of the light to be measured when the applied voltage is constant, and the intensity of the light to be measured is an independent variable, and ② the voltage signal applied to the photoconductive photodetector is periodic and has a time average value of almost zero and an amplitude represented as an almost even function of a time when an origin is set at time of a middle point between adjacent times at which the amplitude becomes zero.

As for the current modulation type, it is preferable that, in the photoconductive photodetector, ① a voltage value generated across the photoconductive photodetector be represented as an almost odd function of an applied current in a predetermined domain including an applied current value of 0 A when an intensity of the light to be measured is constant, and the applied current value is an independent variable, and at the same time, the voltage value generated across the photoconductive photodetector be represented as an almost linear function of an illumination signal intensity in a domain having a predetermined intensity of the light to be measured when the applied current is constant, and the intensity of the light to be measured is an independent variable, and ② a non-DC component of the current signal applied to the photoconductive photodetector is periodic and has a time average value of almost zero and an amplitude represented as an almost even function of a time when an origin is set at time of a middle point between adjacent times at which the amplitude of the non-DC component becomes zero.

As the photoconductive photodetector, it is practical to use ① a metal-semiconductor-metal photodetector having a structure in which rectifying junctions are connected in opposite directions or ② a photodetector having a structure in which ohmic contact electrodes are connected to oppose each other.

Two almost monochromatic light beams having different wavelengths and incident on almost the same area of the photoconductive photodetector, which generate a heterodyne beat signal on the photoconductive photodetector, can be used as the light to be measured.

In the optical frequency mixing apparatus of the present invention, the AC signal (frequency=$f_3$) generated by the signal generator is supplied to the signal supply terminal of the photoconductive photodetector through the signal supply unit as a modulation electrical signal. As the form of this modulation electrical signal, a voltage signal output in a low output impedance state or a current signal output in a high output impedance state can be used. In this state, two optical signals (optical frequencies=$f_1$ and $f_2$) are incident on almost the same photodetecting area of the photoconductive photodetector. The two optical signals are mixed with each other on the photoconductive photodetector, and a beat signal having the difference frequency ($|f_1-f_2|$) between the two optical signals is detected as a heterodyne signal. On the other hand, since the modulation electrical signal is applied to the photoconductive photodetector, as described above, the beat signal is modulated by the modulation electrical signal. As a result, a modulation current signal flowing through the photoconductive photodetector includes the components having sum and difference frequencies ($|f_1-f_2+f_3|$ and $||f_1-f_2|-f_3|$) between the frequency of the beat signal and that of the modulation electrical signal. The modulation current signal is output as a voltage signal through the conversion amplification unit. The voltage signal output from the conversion amplification unit is supplied to the frequency selector. Of the sum and difference frequencies between the frequency of the beat signal and the frequency of the modulation voltage signal, only one frequency component is selected and output. That is, in the optical frequency mixing apparatus of the present invention, frequency mixing processing is executed by the photoconductive photodetector. Light is converted into a signal in a frequency band convenient for electrical processing, and thereafter, electrical amplification is performed. Even when one light which is intensity-modulated by the intensity modulation frequency ($f_1$) is incident, the optical frequency mixing apparatus of the present invention provides the same function, and a signal having one of the two frequencies ($|f_1+f_3|$ and $|f_1-f_3|$) can be obtained.

In addition, an electrical signal whose non-DC component of the electrical signal applied to the photoconductive photodetector is periodic and has a time average value of almost zero and an amplitude represented as an almost even function of a time when an origin is set at time of a middle point between adjacent times at which the amplitude becomes zero is selected, and the bias of the applied electrical signal value is adjusted. In this case, the DC component of background light is removed. At the same time, background light having an AC component other than the frequency of the modulation voltage signal is also reduced, thereby performing measurement.

According to the optical frequency mixing apparatus of the present invention, the photoconductive photodetector is used as a photodetecting element, and modulation of a photodetection signal by a predetermined frequency signal, which includes generation of a heterodyne beat signal upon incidence of two optical signals, is simultaneously performed by the photoconductive photodetector. For this reason, a frequency mixing operation can be executed within a wide frequency measurement range while decreasing the number of parts, and an electrical signal having a frequency component convenient for processing by the electrical circuits at the subsequent stage can be supplied.

In addition, a photoconductive photodetector such as a metal-semiconductor-metal (MSM) photodetector in which the amount of a current flowing through the photoconductive photodetector is represented as an almost odd function of an applied voltage in a predetermined domain including an applied voltage value of 0 V when the amount of illumination light is constant, and the applied voltage value is an independent variable, and at the same time, the amount of the current flowing through the photoconductive photodetector is represented as an almost linear function of the amount of illumination light in a domain having a predetermined amount of illumination light when the applied voltage is constant, and the amount of illumination light is an independent variable is used. As a voltage signal applied to the photoconductive photodetector, a voltage signal which is periodic and has a time average value of almost zero and an amplitude represented as an almost even function of a time when an origin is set at time of a middle point between adjacent times at which the amplitude becomes zero is used. For this reason, the influence of background light can be minimized, thereby precisely executing frequency mixing.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the present invention will be described below with reference to the accompanying drawings. The same reference numerals denote the same elements throughout the drawings, and a detailed description thereof will be omitted.

Figure 4:
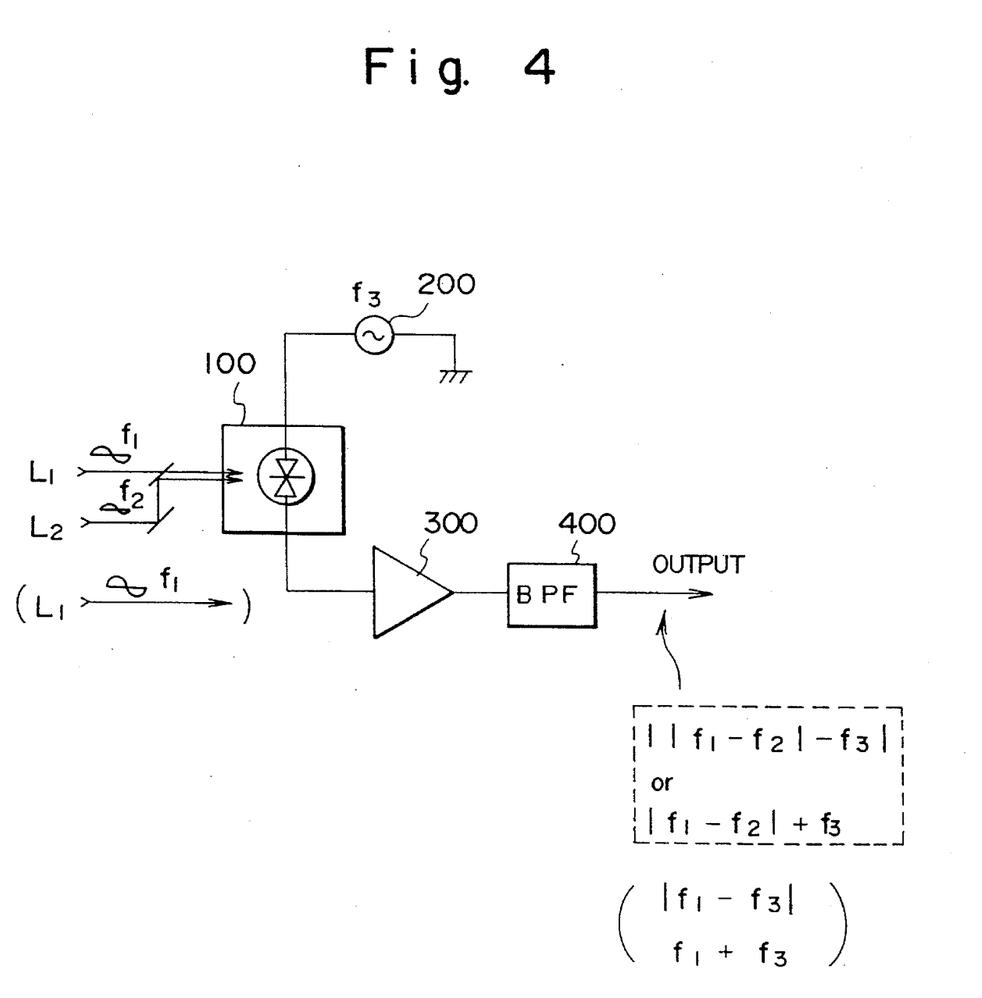
FIG. 4 is a block diagram showing the basic arrangement of an optical frequency mixing apparatus of the present invention.

FIG. 4 is a block diagram showing the basic arrangement of an optical frequency mixing apparatus of the present invention. As shown in FIG. 4, this apparatus has (a) a photodetecting unit 100, (b) a signal generator 200, (c) a conversion amplification unit 300, and (d) a frequency selector 400. The photodetecting unit 100 has a photoconductive photodetector for receiving light to be measured. The signal generator 200 supplies a signal having a modulation frequency ($f_3$) to the photoconductive photodetector of the photodetecting unit 100. The conversion amplification unit 300 outputs a voltage signal according to a current signal generated in the photodetecting unit 100 upon reception of light. The frequency selector 400 passes a predetermined frequency component included in the voltage signal output from the conversion amplification unit 300. In the optical frequency mixing apparatus of the present invention, mixing the frequency of the incident light intensity and the frequency ($f_3$) of an AC signal generated by the signal generator 200, i.e., product calculation of the two signals is executed by the photoconductive photodetector of the photodetecting unit 100. One of the sum and difference between the frequencies of the two signals, which are obtained as a result of product calculation, is selected and extracted using the frequency selector 400. The optical signal incident on the photoconductive photodetector may be one optical signal whose light intensity has an AC component (frequency=$f_1$). Alternatively, two optical signals having a predetermined light intensity and different wavelengths (optical frequencies=$f_1$ and $f_2$) may be incident on almost the same photodetecting area of the photoconductive photodetector.

An embodiment of the optical frequency mixing apparatus of the present invention will be described below in detail.

Figure 5:
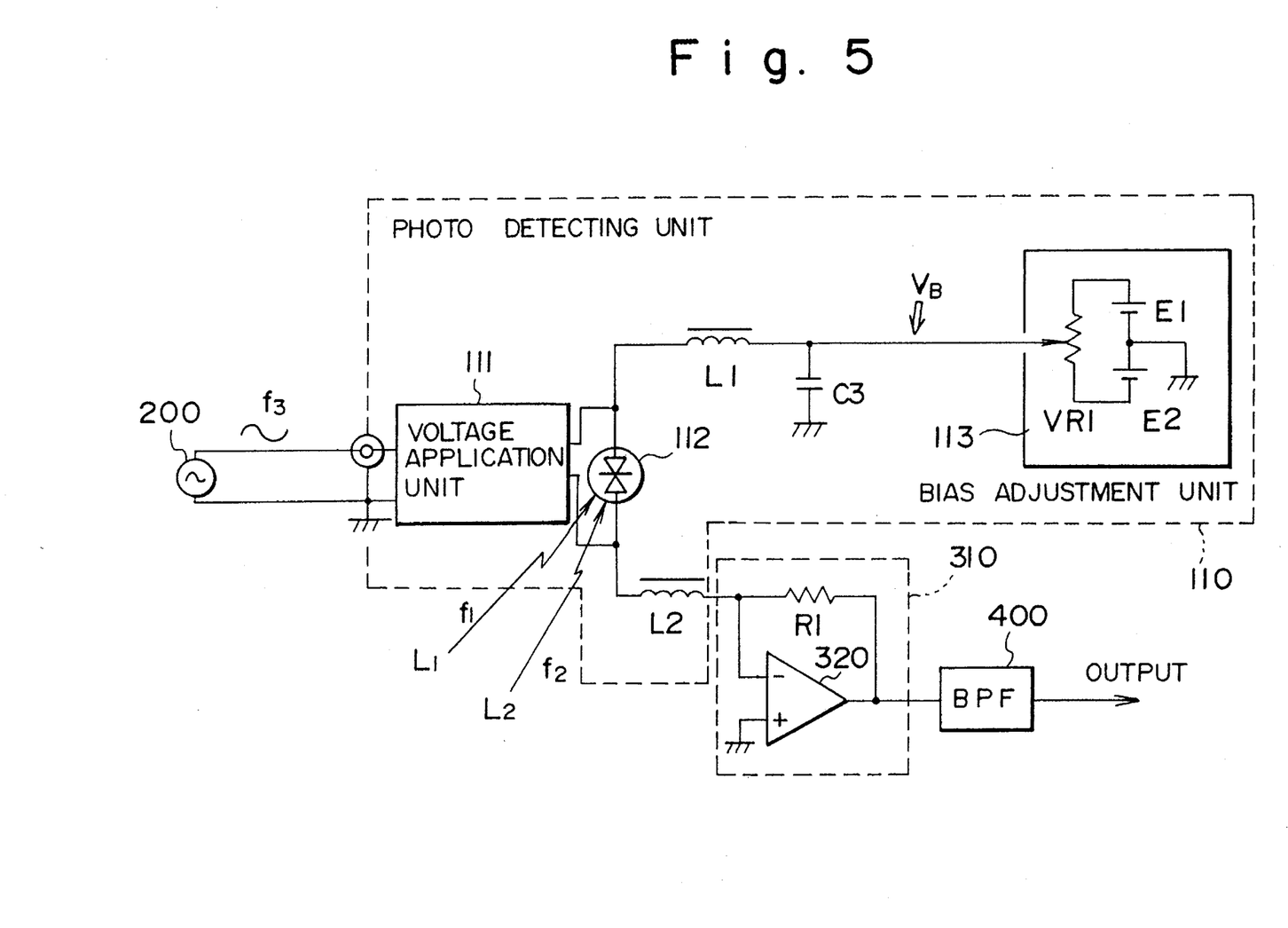
FIG. 5 is a block diagram showing the arrangement of an optical frequency mixing apparatus according to the first embodiment of the present invention.

FIG. 5 is a block diagram showing the arrangement of an optical frequency mixing apparatus according to the first embodiment, whose basic arrangement is shown in FIG. 4. As shown in FIG. 5, this apparatus has (a) a photodetecting unit 110, (b) a signal generator 200, (c) a current-to-voltage conversion unit 310, and (d) a bandpass filter (to be referred to as a BPF hereinafter) 400. The photodetecting unit 110 has a photoconductive photodetector for receiving light to be measured. The signal generator 200 supplies a signal having a modulation frequency ($f_3$) to the photoconductive photodetector of the photodetecting unit 110. The current-to-voltage conversion unit 310 converts a current signal generated in the photodetecting unit 110 upon reception of light into a voltage signal. The BPF 400 passes a predetermined frequency component included in the voltage signal output from the current-to-voltage conversion unit 310.

The photodetecting unit 110 has ① a voltage application unit 111 for receiving an electrical signal output from the signal generator 200 and outputting a voltage signal in a low impedance state, ② a photoconductive light receiving device 112, having a voltage application terminal for receiving a voltage signal ($V_1$) output from the voltage application unit 111, for receiving light to be measured, ③ a bias adjustment unit 113 for setting the operation of the photoconductive photodetector 112 such that an output current value with respect to DC light incidence such as background light becomes zero, and ④ passive elements (L1, L2, and C3) for inductively connecting these elements. A current generated in the photoconductive photodetector 112 flows through the choke coils L1 and L2.

Figure 6:
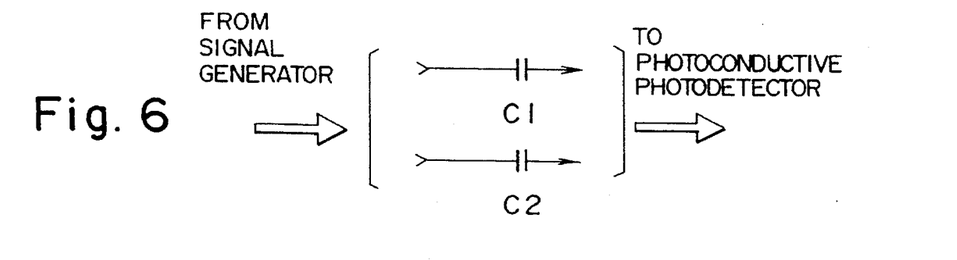
FIGS. 6 to 8 are circuit diagrams of voltage application units applicable to the optical frequency mixing apparatus of the first embodiment.
Figure 7:
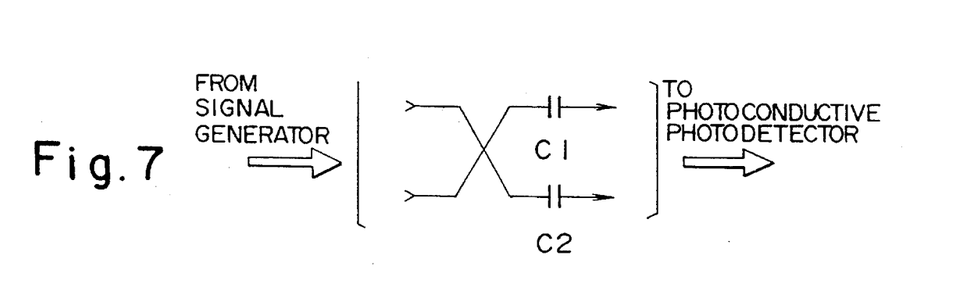
Figure 8:
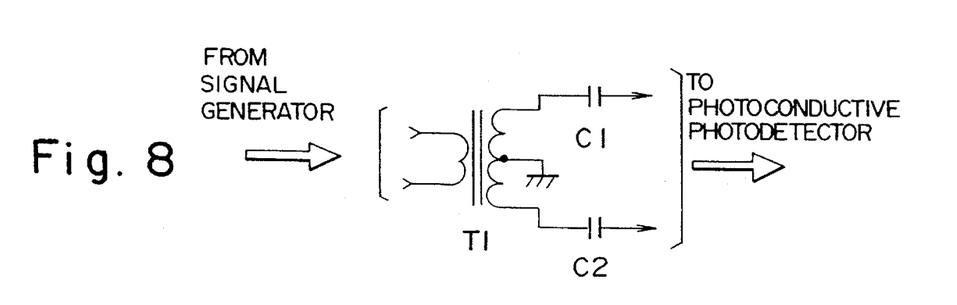

FIGS. 6 to 8 are circuit diagrams of voltage application units applicable to this embodiment. In the circuit shown in FIG. 6, capacitors C1 and C2 are inserted in the signal lines to convert a voltage signal output from the signal generator 200 into an AC voltage signal in a floating state. In the circuit shown in FIG. 7, the signal polarity of the circuit in FIG. 6 is inverted. In the circuit shown in FIG. 8, a transformer T1 receives a voltage signal output from the signal generator 200 and transforms the voltage signal into an AC voltage signal in a floating state. The apparatus of this embodiment uses the circuit in FIG. 5.

The photoconductive photodetector 112 is constituted by a metal-semiconductor-metal (MSM) photodetector using GaAs as a material. The photoconductive photodetector 120 has characteristics representing that, in a predetermined domain including an applied voltage of 0 V, the amount of a current flowing through the photoconductive photodetector is represented as an odd function of an applied voltage when the amount of illumination light is constant, and an applied voltage value is an independent variable.

The bias adjustment unit 113 is constituted by a variable resistor VR1 for adjusting a bias voltage value, and DC power supplies E1 and E2 connected in series with each other and connected to the terminals of the variable resistor VR1. The connection point between the DC power supplies E1 and E2 is grounded.

The current-to-voltage conversion unit 310 is constituted by an operational amplifier 320 having a grounded positive input terminal and a negative input terminal connected to an output terminal through a resistor R1.

Figure 9:
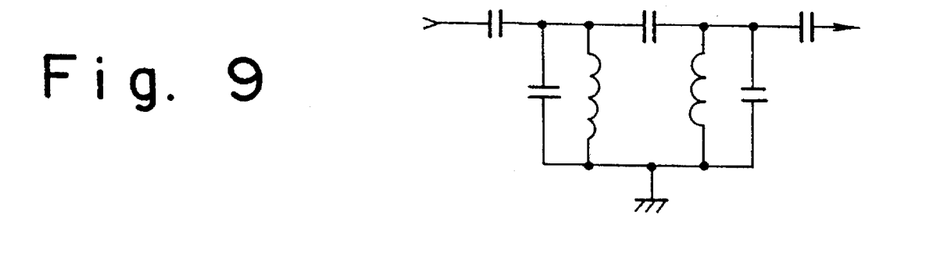
FIGS. 9 to 11 are circuit diagrams of bandpass filters applicable to the optical frequency mixing apparatus of the first embodiment.
Figure 10:
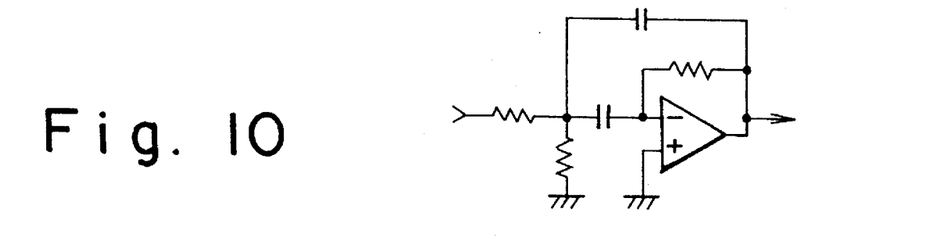
Figure 11:
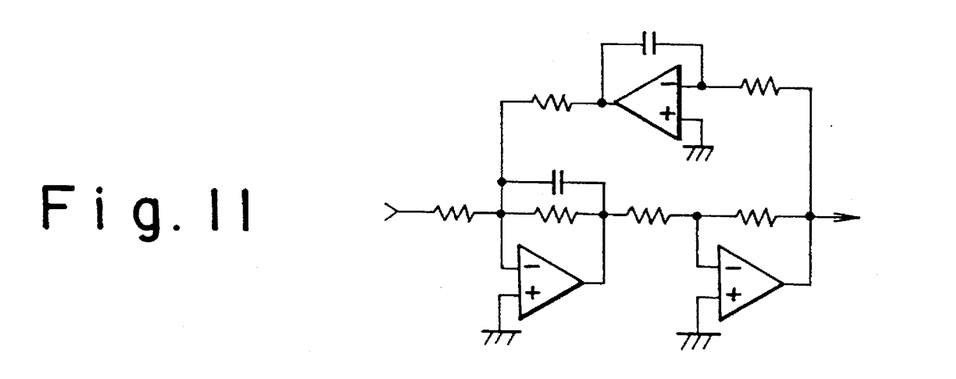

FIGS. 9 to 11 are circuit diagrams of bandpass filters applicable to the apparatus of this embodiment. FIG. 9 shows the circuit arrangement of a passive bandpass filter. FIGS. 10 and 11 show circuit arrangements of active bandpass filters. This embodiment uses the passive bandpass filter shown in FIG. 9. The characteristic value of each element is determined by a target frequency value.

The apparatus of this embodiment executes optical frequency mixing in the following manner. As incident light, two optical signals having a predetermined intensity are incident on almost the same photodetecting area of the photoconductive photodetector. The optical frequencies of these optical signals are defined as $f_1$ and $f_2$, respectively. A signal to be eventually obtained is a signal having a frequency ($||f_1-f_2|-f_3|$) which corresponds to a difference between the frequency ($=|f_1-f_2|$) of the heterodyne beat signal of the incident light and the frequency ($=f_3$) of an AC signal generated by the signal generator 200.

Figure 12:
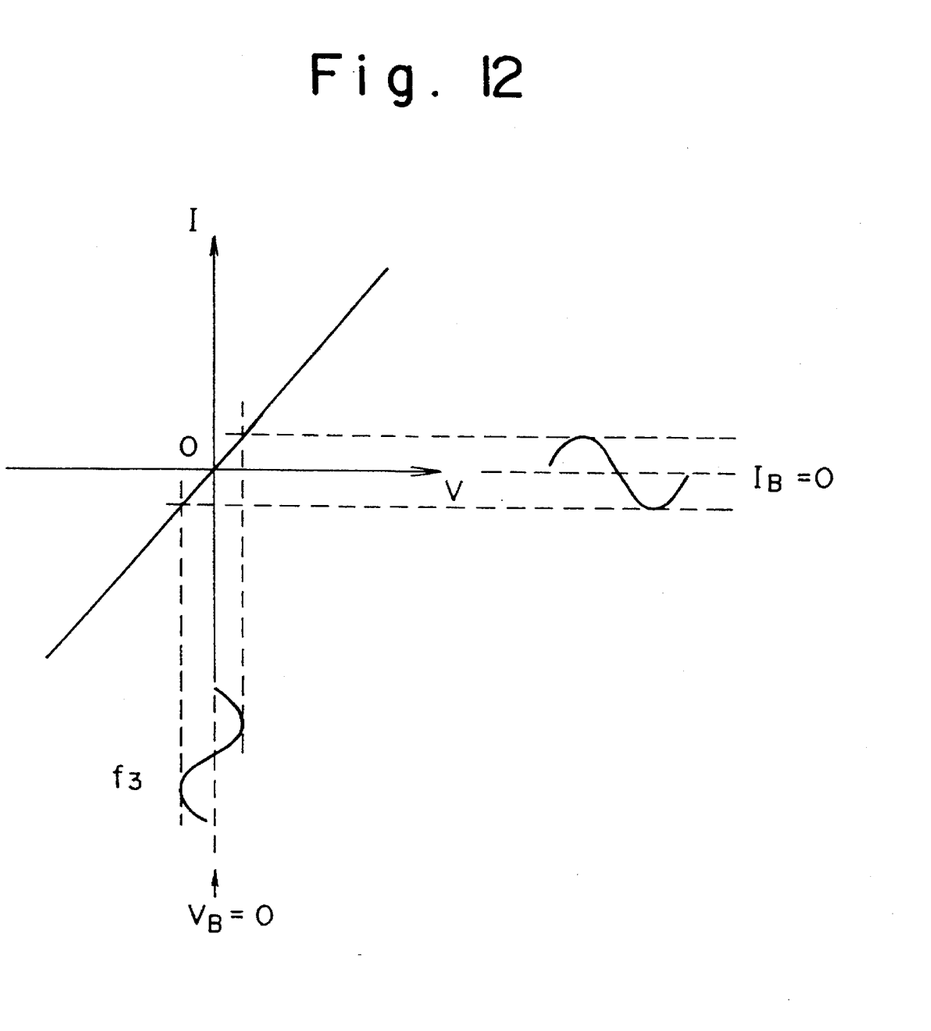
FIG. 12 is a graph for explaining the modulation characteristics of the optical frequency mixing apparatus of the first embodiment.

The signal generator 200 generates an AC signal having the component of the frequency ($f_3$) and supplies the signal to the photodetecting unit 110. The photodetecting unit 110 applies the AC signal supplied from the signal generator 200 to the voltage application terminal of the photoconductive photodetector 112 through the voltage application unit 111 as a modulation voltage signal. As a voltage signal applied to the photoconductive photodetector 112, a voltage signal which is periodic and has a time average value of almost zero and an amplitude represented as an even function of a time when an origin is set at time of a middle point between adjacent times at which the amplitude becomes zero is selected. In addition, the bias circuit is adjusted to cause only background light to be incident. In this state, a current value ($I_B$) flowing through the photoconductive photodetector is set to "0 A". FIG. 12 is a graph for explaining the modulation characteristics of the photoconductive photodetector 112 set in this state. As shown in FIG. 12, for modulation by an applied voltage, "0 V" is set as a central voltage value ($V_B$) of bias of a modulation voltage signal. As a result, even with a modulation voltage signal having a large amplitude, the linearity of a modulated output is guaranteed.

In this state, two optical signals $L_1$ and $L_2$ (frequencies=$f_1$ and $f_2$) are incident on almost the same photodetecting area of the photoconductive photodetector 112. The two optical signals $L_1$ and $L_2$ are mixed with each other on the photoconductive photodetector 112, and a beat signal having the difference frequency ($|f_1-f_2|$) between the two optical signals $L_1$ and $L_2$ is detected as a heterodyne signal. On the other hand, since the modulation voltage signal is applied to the photoconductive photodetector 112, as described above, the beat signal is modulated by the modulation voltage signal. As a result, a modulation current signal flowing through the photoconductive photodetector 112 includes the components of frequencies including a sum ($|f_1-f_2|+f_3$) and a difference ($||f_1-f_2|-f_3|$) between the frequency of the beat signal and that of the modulation voltage signal. The modulation current signal is supplied to the current-to-voltage conversion unit 310 through the choke coil L2, converted into a voltage signal, and output. Of the components of the two frequencies ($|f_1-f_2|+f_3$ and $||f_1-f_2|-f_3|$) output from the current-to-voltage conversion unit 310, only the component of the difference frequency ($||f_1-f_2|-f_3|$) passes through the bandpass filter 400 and is output from the apparatus.

Figure 13:
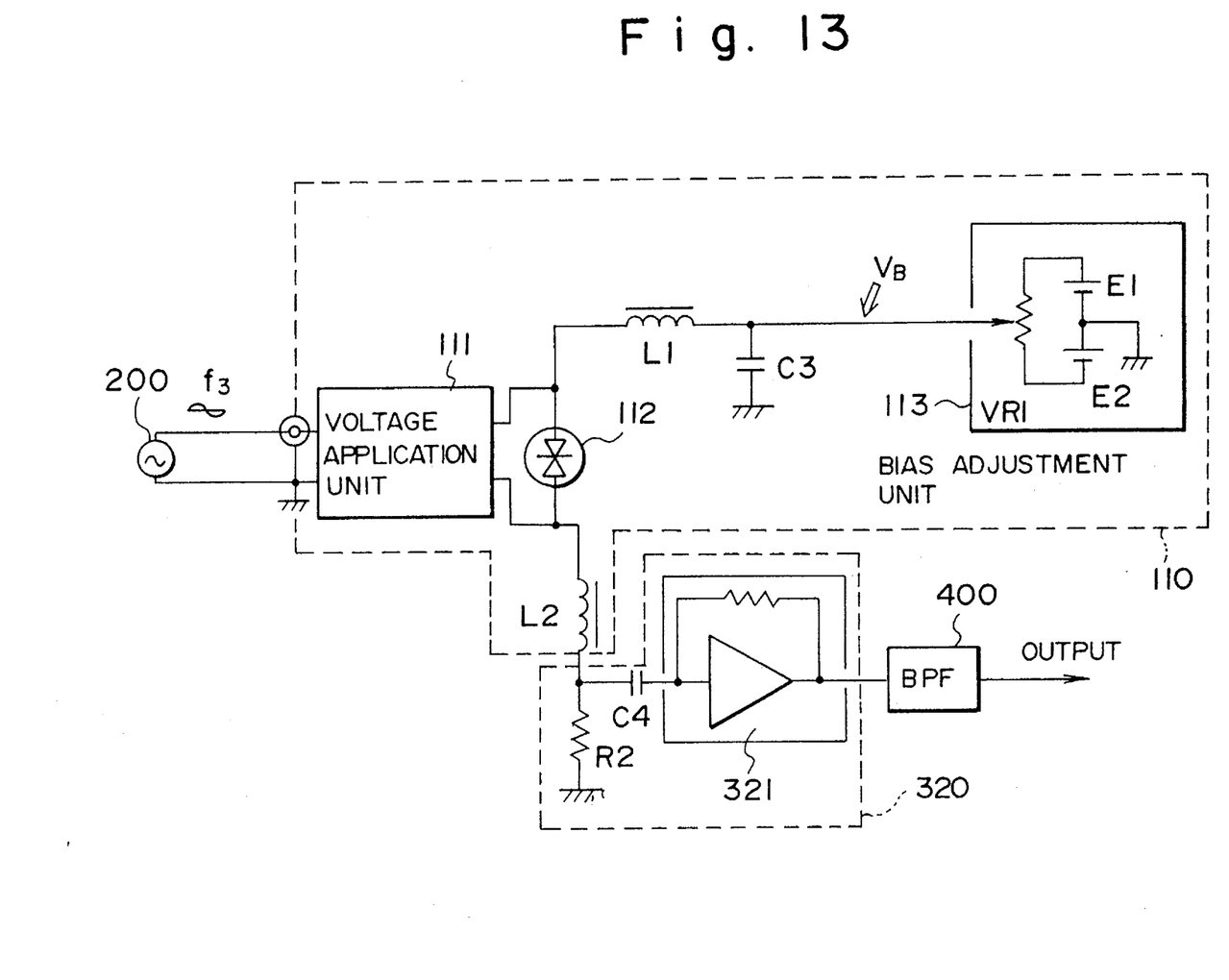
FIG. 13 is a block diagram showing the arrangement of the first modification of the optical frequency mixing apparatus of the first embodiment.

The apparatus of this embodiment can also be modified. FIG. 13 is a block diagram showing the arrangement of the first modification of the apparatus of this embodiment. This apparatus is different from that of the first embodiment only in the current-to-voltage conversion unit. As shown in FIG. 13, a current-to-voltage conversion unit 320 of this apparatus is constituted by ① a resistor R2 for converting a current value into a voltage value by flowing a current generated by the photoconductive photodetector 112, ② a capacitor C4 for removing the DC component of a voltage signal generated across the resistor R2, and ③ an amplifier 321 for amplifying an AC signal transmitted through the capacitor C4. Although the function is the same as that of the current-to-voltage conversion unit 310 of the first embodiment, the current-to-voltage conversion unit 320 is superior in performance because 1/f noise generated in the amplifier can be minimized.

Figure 14:
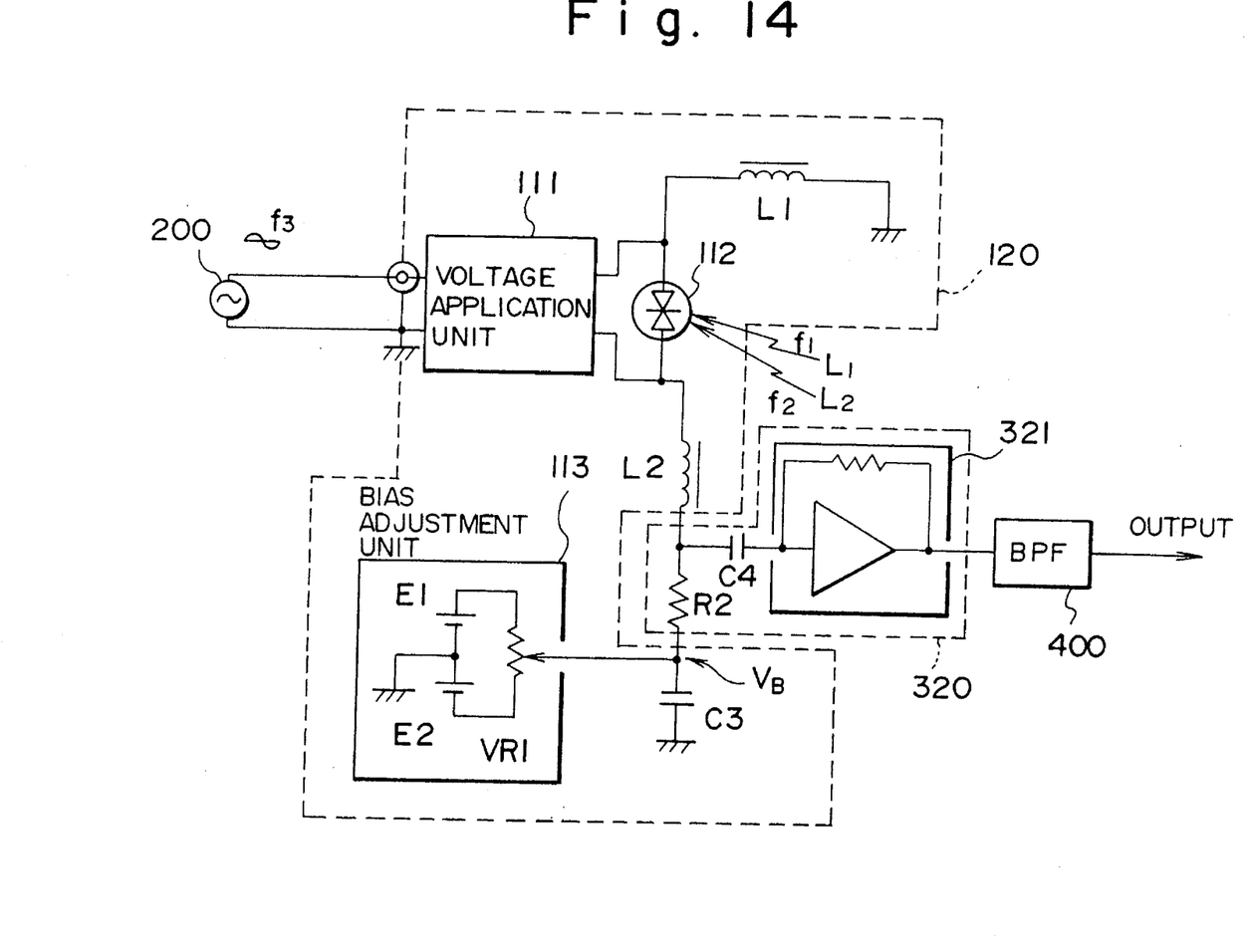
FIG. 14 is a block diagram showing the arrangement of the second modification of the optical frequency mixing apparatus of the first embodiment.

FIG. 14 is a block diagram showing the arrangement of the second modification of the apparatus of this embodiment. This apparatus is different from that of the first modification in the bias adjustment position. As shown in FIG. 14, the bias adjustment point in this apparatus is at a terminal different from the terminal for connecting the capacitor C4 of the resistor R2. With this arrangement, the same function as that of the first embodiment can be realized.

Even when one light which is intensity-modulated by the intensity modulation frequency ($f_1$) is incident, the apparatuses of this embodiment and the modifications thereof exhibit the same function, and a signal having the frequency ($|f_1-f_3|$) can be obtained.

Figure 15:
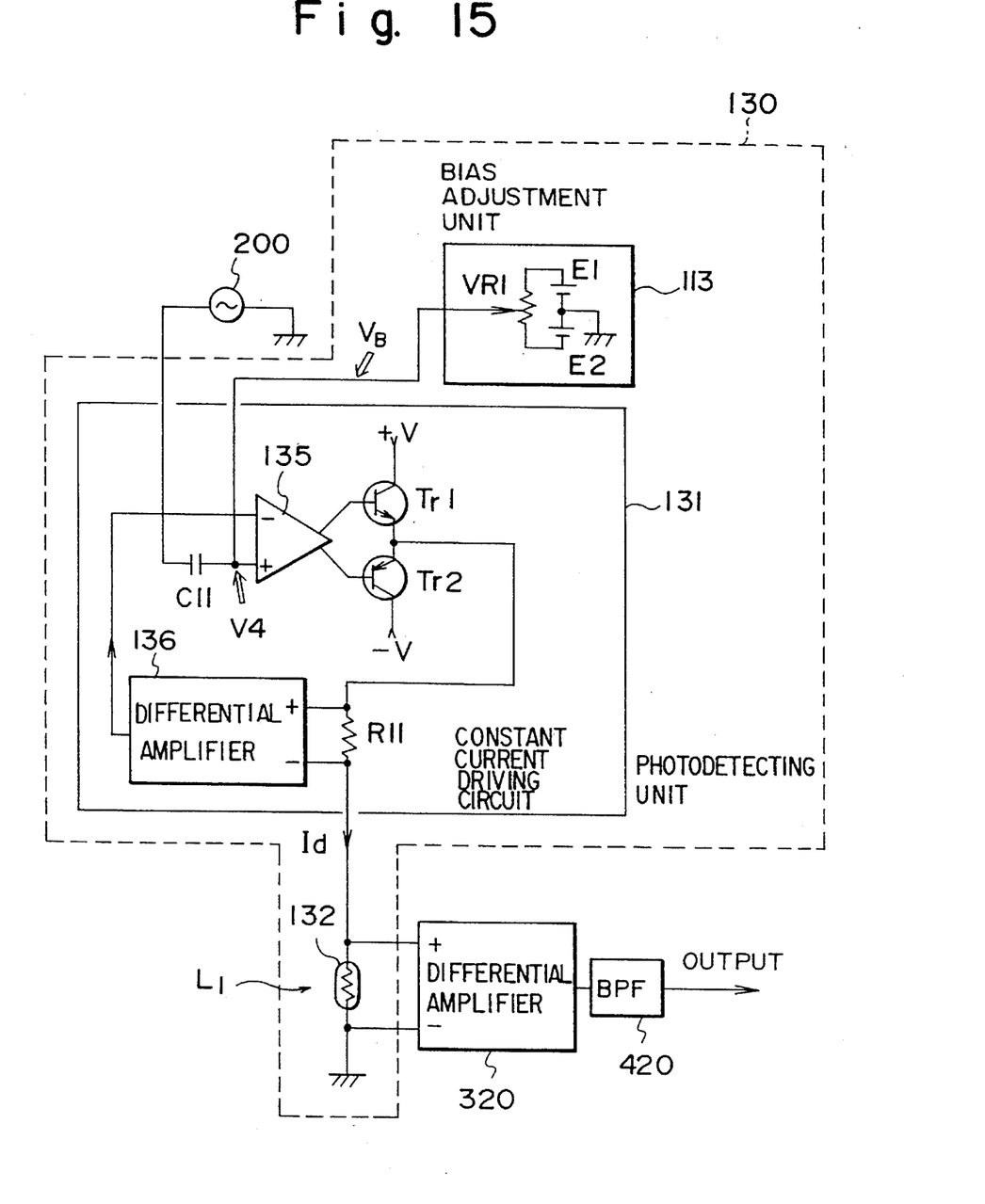
FIG. 15 is a block diagram showing the arrangement of an optical frequency mixing apparatus according to the second embodiment of the present invention.

FIG. 15 is a block diagram showing the arrangement of an optical frequency mixing apparatus according to the second embodiment, whose basic arrangement is shown in FIG. 4. Some photoconductive photodetectors exhibit a low dark resistance so they are not suitable for voltage application as in the first embodiment (for example, an MCT (HgCdTe) photodetector having a sensitivity in an infrared region at a wavelength of 2 to 17 μm has a dark resistance of 40Ω). When such a photoconductive photodetector is used, a method in which a current is supplied from a current supply having an equivalently very large output impedance, and this supplied current is modulated, thereby detecting a voltage generated across the photodetector is superior in stability and S/N ratio, as compared to a method in which the gain of the photodetector is modulated by applying a voltage. This embodiment uses this method.

As shown in FIG. 15, the apparatus of this embodiment has (a) a photodetecting unit 130, (b) a signal generator 200, (c) a differential amplifier 320, and (d) a bandpass filter 420. The photodetecting unit 130 has a photoconductive photodetector for receiving light to be measured. The signal generator 200 supplies a signal having a modulation frequency ($f_3$) to the photoconductive photodetector of the photodetecting unit 130. The differential amplifier 320 amplifies a voltage signal generated by a current generated in the photodetecting unit 130 upon reception of light. The BPF 420 passes a predetermined frequency component included in the voltage signal output from the differential amplifier 320.

The photodetecting unit 130 has ① a constant current driving circuit 131 for receiving an electrical signal output from the signal generator 200 and supplying a current signal in a high impedance state in accordance with an AC component value of the electrical signal, ② a photoconductive photodetector 132, having a current supply terminal for inputting/outputting a current supplied from the constant current driving circuit 131, for receiving light to be measured, and ③ a bias adjustment unit 113 for setting the average driving current value of the constant current driving circuit 131. The constant current driving circuit 131 has ① a capacitor C11 for receiving a voltage signal output from the signal generator 200 at one terminal and a bias voltage ($V_B$) output from the bias adjustment unit 113 at the other terminal, and outputting an AC voltage signal ($V_4(t)=V_B+V_3(t)$) which is DC-biased from the other terminal by only a bias voltage value, ② an operational amplifier 135 for receiving the voltage signal $V_4(t)$ at a positive input terminal, amplifying a difference between the voltage and a voltage input to a negative input terminal (gain=G1), and outputting (two outputs) the voltage, ③ a transistor Tr1, having a base terminal for receiving a positive output from the operational amplifier 135 and a collector terminal connected to a positive power supply (+V) and a transistor Tr2 having a base terminal for receiving a negative output from the operational amplifier 135, a collector terminal connected to a negative power supply (−V), and an emitter terminal connected to the emitter terminal of the transistor Tr1, ④ a resistor R11 having one terminal connected to the emitter terminal of the transistor Tr1 (and the emitter terminal of the transistor Tr2) and the other terminal connected to one of the current input/output terminals of the photoconductive photodetector 132, and ⑤ a differential amplifier 136 having a positive input terminal connected to one of the terminals of the resistor R11, a negative input terminal connected to the other terminal of the resistor R11, and an output terminal connected to the negative input terminal of the operational amplifier 135.

The apparatus of this embodiment executes optical frequency mixing in the following manner. As incident light, an optical signal whose light intensity has the AC component of a frequency $f_1$. A signal to be eventually obtained is a signal having a frequency ($|f_1-f_3|$) which corresponds to a difference between the intensity modulation frequency ($=f_1$) of the incident light and the frequency ($=f_3$) of an AC signal generated by the signal generator 200.

A voltage ($=$r11·Id) generated across the resistor R11 by a current Id flowing through the resistor R11 (resistance value=r11) is amplified by the differential amplifier 136 and supplied to the negative input terminal of the operational amplifier 135. The operational amplifier 135 controls the transistors Tr1 and Tr2 such that the voltage value of the negative input terminal of the operational amplifier 135 coincides with the voltage value $V_4(t)$ supplied to the positive input terminal. As a result, the current value Id flowing through the photoconductive photodetector 132 is represented as follows:

$$\begin{aligned} Id &= V_4(t)/(G2 \cdot r11) \quad (1) \\ &= (V_B/(G2 \cdot r11)) + (V_3(t)/(G2 \cdot r11)) \\ G2 &= \text{Differential Amplifier Gain} \end{aligned}$$

More specifically, the current value Id is not influenced by the resistance value of the photoconductive photodetector 132, and the amount of a change in current value Id is proportional to the modulation voltage signal, i.e., the AC component $V_3(t)$ of the voltage signal generated by the signal generator 200.

In this state, when an optical signal $L_1$ (intensity modulation frequency=$f_1$) is supplied to the photoconductive photodetector 132, a voltage signal according to a product value between the modulation voltage $V_3(t)$ and the AC component of the incident light is generated between the current input/output terminals of the photoconductive photodetector 132. The voltage signal includes the AC components of two frequencies ($|f_1-f_3|$ and $f_1+f_3$). The voltage signal including these AC components is amplified by the differential amplifier 320, and thereafter, the component of the frequency= $|f_1-f_3|$ is selected by the bandpass filter 420, passes through the bandpass filter 420, and is output from the apparatus.

The present invention is not limited to the above embodiments, and various changes and modifications can be made without departing the spirit and scope of the invention. For example, as the photoconductive photodetector, one having the same electrode structure as the MSM electrode structure and a sensitivity to a wavelength longer than that corresponding to an energy bandgap, or one having a Schottky contact electrode on the rear surface in addition to the MSM electrode structure and a sensitivity to a wavelength longer than that corresponding to the energy bandgap of the substrate (GaAs) can also be used. In place of GaAs, InP or GaP can be preferably used. In addition, a mixed crystal compound semiconductor such as InGaAs can be used for the long wavelength region for optical communication. Furthermore, although the response frequency is limited, a photoconductive photodetector as of PbS, CdS, and CdSe can also be used.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.154910/1994 filed on Jul. 6, 1994 is hereby incorporated by reference.

What is claimed is:

1. An optical frequency mixing apparatus comprising:
   a signal generator for generating an AC electrical signal having a first frequency;
   a signal supply unit for receiving the AC electrical signal output from said signal generator, converting the AC electrical signal into a predetermined output form, and outputting an electrical signal;
   a photoconductive photodetector for receiving light to be measured including a component of a second frequency, the photoconductive photodetector having an electrical signal application terminal for receiving the electrical signal output from the signal supply unit;
   a conversion amplification unit for outputting a voltage signal proportional to a current signal flowing through said photoconductive photodetector; and
   a frequency selector for receiving the voltage signal output from said conversion amplification unit, selecting and passing one of a voltage signal having substantially the same frequency as that of a sum of the first frequency and the second frequency or a voltage signal having substantially the same frequency as that corresponding to an absolute value of a difference between the first frequency and the second frequency.

2. An apparatus according to claim 1, wherein the predetermined output form is a voltage signal output in a low output impedance state.

3. An apparatus according to claim 1, wherein the predetermined output form is a current signal output in a high output impedance state.

4. An apparatus according to claim 1, further comprising bias adjustment means for adjusting an operating point of said photoconductive photodetector.

5. An apparatus according to claim 2, wherein, in said photoconductive photodetector,
   an amount of the current signal flowing through said photoconductive photodetector is represented as a substantially odd function of an applied voltage within a predetermined domain including an applied voltage value of 0 V when an intensity of the light to be measured is constant, and the applied voltage value is an independent variable, and at the same time, the amount of the current flowing through said photoconductive photodetector is represented as a substantially linear function of an illumination signal intensity in a domain having a predetermined intensity of the light to be measured when the applied voltage is constant, and the intensity of the light to be measured is an independent variable, and
   the voltage signal applied to said photoconductive photodetector is periodic and has a time average value of substantially zero and an amplitude represented as a substantially even function of a time when an origin is set at time of a middle point between adjacent times at which the amplitude becomes zero.

6. An apparatus according to claim 3, wherein, in said photoconductive photodetector,
   a voltage value generated across said photoconductive photodetector is represented as a substantially odd function of an applied current within a predetermined domain including an applied current value of 0 A when an intensity of the light to be measured is constant, and the applied current value is an independent variable, and at the same time, the voltage value generated across said photoconductive photodetector is represented as a substantially linear function of an illumination signal intensity in a domain having a predetermined intensity of the light to be measured when the applied current is constant, and the intensity of the light to be measured is an independent variable, and
   a non-DC component of the current signal applied to said photoconductive photodetector is periodic and has a time average value of substantially zero and an amplitude represented as a substantially even function of time when an origin is set at a time corresponding to a middle point between adjacent times at which the amplitude of the non-DC component becomes zero.

7. An apparatus according to claim 1, wherein said photoconductive photodetector is a metal-semiconductor-metal photodetector having a structure in which rectifying junctions are connected in opposite directions.

8. An apparatus according to claim 1, wherein said photoconductive photodetector is a photodetector having a structure in which ohmic contact electrodes are connected to oppose each other.

9. An apparatus according to claim 1, wherein the light to be measured is two substantially monochromatic light beams having different wavelengths and incident on substantially the same area of the photoconductive photodetector, which generate a heterodyne beat signal on said photoconductive photodetector.

\* \* \* \* \*